United States Patent
Dunbar

[15] 3,649,902
[45] Mar. 14, 1972

[54] DC TO AC INVERTER FOR PRODUCING A SINE-WAVE OUTPUT BY PULSE WIDTH MODULATION

[72] Inventor: Robert A. Dunbar, Swampscott, Mass.
[73] Assignee: General Electric Company
[22] Filed: June 15, 1970
[21] Appl. No.: 46,017

[52] U.S. Cl. ............................................................321/9 A
[51] Int. Cl. .........................................................H02m 1/12
[58] Field of Search........................................321/9, 9 A, 45

[56] References Cited

UNITED STATES PATENTS 3,310,730  3/1967  Ruch.......................................321/9 A
3,504,264  3/1970  Suelzle.....................................321/2

OTHER PUBLICATIONS

Principles of Inverter Circuits, Bedford & Hoft, John Wiley & Son, Inc., New York, London, Sydney, pp. 310– 313 Relied on, Dec. 23, 1964

*Primary Examiner*—William M. Shoop, Jr.
*Attorney*—I . David Blumenfeld, Frank L. Neuhauser, Oscar B. Waddell and Joseph B. Forman

[57] ABSTRACT

A DC to AC bridge inverter circuit produces a sine wave output of low-harmonic content. One transistor of each pair of transistors in opposite arms of the inverter bridge is switched into conduction at the desired output frequency; i.e., 400 times per sec. for a 400 Hz. output. The remaining complementary transistor of each pair is switched on and off $n$ times per alternation to produce $n$ constant amplitude, variable width output pulses during each alternation. The duration of the conduction time of the complementary transistor is controlled so that the area of each pulse is equal to the area of the corresponding sinusoidal segment where each sinusoidal segment represents an angle $\phi$, in electrical degrees equal to: $\phi = 180°/n$. These variable width output pulses are applied to a filter to produce a sinusoidal output having low-harmonic content. A clock-driven logic system controls the complementary transistor of each transistor pair turning it on $n$ times per alternation and turning it off at different times during each interval to produce the desired sinusoidal pulse width modulation. The turnoff pulses are generated by a clock-driven divider and associated AND gates. Each of the AND gates is energized in response to a predetermined count from the divider to produce a turnoff pulse during each of the $n$ intervals at a point in time during each interval such that the pulse width is proportional to the sine of the angle.

6 Claims, 20 Drawing Figures

FIG. 1

INVENTOR
ROBERT DUNBAR
BY
ATTORNEY

INVENTOR
ROBERT DUNBAR
BY David Blumenfeld
ATTORNEY

DC TO AC INVERTER FOR PRODUCING A SINE-WAVE OUTPUT BY PULSE WIDTH MODULATION

This invention relates to a DC to AC inverter and more particularly, to a transistorized switching inverter which produces a sinusoidal output signal by means of pulse width modulation.

DC to AC inverters are well-known circuits used to change unidirectional to alternating current power. One of the most common, and also one of the most useful categories of such DC to AC inverters are the so-called switching or "Chopper" inverters in which two or more switching devices such as transistors are connected in circuit with a DC source and are selectively driven into conduction at a predetermined rate to convert or "chop" into a square wave alternating output. There are many varieties of such circuits. One class is the push-pull inverting circuit in which a pair of transistors is connected in circuit with a DC source and a transformer. The transistors are alternately driven into conduction at the desired rate by an external synchronizing signal to produce current flow in the output transformer and a square wave AC output at the secondary of the transformer. Alternately, oscillating DC to AC converters may be used to generate the square wave thereby eliminating the requirement for synchronizing signals to drive the transistors. In a system of this type, a pair of transistors is connected in circuit with the DC source and the primary of a saturable transformer having a core of a magnetic material which was a rectangular hysteresis loop. The transistors are alternately driven into conduction and cutoff to convert or "chop" the DC into a square wave by a saturation of the transformer. The time required to saturate the core, and hence, the pulse repetition rate, is proportional to the voltage time integral $$\int e\,dt$$

of the applied voltage, which in turn, is dependent on the number of turns, core cross section, etc. Still another well-known arrangement for DC to AC conversion is the inverter bridge in which two pairs of transistors are connected as the four arms of a bridge with the DC source across one diagonal of the bridge and the output across the other diagonal. The transistor pairs in opposite arms of the bridge are selectively driven into conduction to convert or "chop" the DC into a square wave pulse train.

Each of the foregoing circuits are useful in converting unidirectional power to AC power. Where a sinusoidal output is required, it is customary to place a filter across the output of the inverter and extract the sinusoidal component from the square wave, which, by definition, consists of a fundamental plus an infinite number of odd harmonics. However, where relatively low-frequency sine waves, in the order of 400 Hz. or the like, are to be furnished, the filtering problem turns out to be extremely troublesome. It will be appreciated that extracting the fundamental sinusoidal component from the square wave requires the harmonics, i.e., the third etc., harmonic have to be discriminated against. Thus, the filter requirements is for an extremely narrow band filter which can pass the 400 Hz. component while discriminating, for example, against the third harmonic, i.e., 1,200 Hz. This makes the filtering problem extremely difficult since it is not a simple problem to design and build a filter which will pass a 400-Hz. signal while having a sharp enough cutoff to discriminate against a 1,200 Hz. signal. Furthermore, if there is a substantial second harmonic component present, as might be the case if the output from the inverter was not a perfect square wave, the problem becomes even more difficult since the filter must pass a 400-Hz. signal while having a sharp enough cutoff to reject an 800-Hz. signal. As a result, it is quite difficult and expensive to produce a sinusoidal output wave from known inverters since the filtering requirements are quite severe. In other words, the filters required to produce a sinusoidal output from the square wave are cumbersome, complex in design, and quite heavy since at these frequencies a substantial amount of iron must be utilized in the filter inductors.

Applicant has found that by generating a variable width rectangular pulse train at the output of the inverter, the harmonic content of the wave, particularly the lower harmonics, second, third, fourth, etc., may be reduced so that only the higher harmonics (15th harmonic or above) are present in any substantial amount. As a result, the filtering problem is much less severe in that it is simpler and easier to construct a filter which will pass the fundamental while discriminating against the higher harmonics. Obviously, the size, weight, complexity and cost of the filter is substantially reduced possibly by as much as an order of magnitude, thereby reducing the overall cost, complexity, and weight of the entire DC to AC inverting system. This, of course, can be an important consideration in applications such as aircraft electrical systems, for example, where minimizing the weight, volume and complexity of the system without sacrificing performance is of crucial importance.

Applicant has discovered that this may be accomplished in a special type of DC to AC bridge inverter which produces a plurality of constant amplitude, variable width pulses. The width of the constant amplitude pulses is varied in such a manner that the area of each rectangular pulse is made equal to a corresponding sinusoidal segment of the desired sine wave output. That is, each alternation of the desired sine wave can be represented by a predetermined number $n$ of sinusoidal segments. A corresponding number of constant amplitude, variable width rectangular pulses are produced by the bridge inverter with the width of each of these pulses varied so that the area of each of the rectangular pulses is equivalent to the area under the corresponding segment of the sine wave. If these constant amplitude, variable width pulses are impressed on a filter, a low harmonic content sine wave of the desired frequency is produced. With this approach, the harmonics, and particularly the low order harmonics are substantially suppressed to the extent that harmonics, only the higher, such as the 17th harmonic and above are present at levels greater than 5 percent of the fundamental. As a result, a relatively simple, lightweight and inexpensive filter may be constructed to extract the fundamental sinusoidal frequency while discriminating against unwanted harmonics.

Accordingly, it is an object of the present invention to provide a DC to AC inverter in which a desired time varying wave form may be produced from a train of variable width rectangular pulses.

Another object of the invention is to provide a DC to AC inverter of the bridge switching type which produces a sinusoidal output waveform with a very low harmonic content.

Still another object of the invention is to provide a DC to AC inverter of the bridge "switching" type in which a sinusoidal output wave form of low harmonic content is provided from a constant amplitude, variable width pulse train produced by the inverter.

Yet another object of the invention is to provide a DC to AC inverter of the bridge switching type for producing a low harmonic content sinusoidal output from a constant amplitude, variable width pulse train in which the width of the individual pulses vary sinusoidally with time.

Yet a further object of the invention is to provide a DC to AC inverter which produces a low harmonic content sinusoidal output form by pulse width modulation techniques.

Other objects and advantages of the instant invention will become apparent as the description thereof proceeds.

Briefly, in accordance with the present invention a transistor bridge inverter is controlled to produce width modulated rectangular pulses, the widths of the individual pulses varying sinusoidally with time so that the application of the pulses to a simple LC filter produces a sinusoidal output wave form having low harmonic content. The transistor pairs in opposite arms of the bridge are controlled by switching pulses to conduct selectively during opposite alternations of the output signal waveform. One transistor of each pair is switched into conduction at the fundamental rate, i.e., switched into and maintained in the conducting state for the duration of each alternation. The remaining or complementary transistor of the pair is switched on and off a predetermined number of times ($n$) during each alternation. Each time that the complementary transistor is turned on, it remains in the conducting state for an interval which is related to the desired sine wave. Thus, for example, if $n=12$ so that each alternation of the desired sine wave is divided into 12 equal intervals, (i.e., intervals of 15 electrical degrees each) the conducting interval for the complementary transistor and hence, the width of the output pulse for that segment is related to the corresponding angular segment of the wave: i.e., 0°–15°, 15°–30°, 30°–45°, etc. It will be seen therefore, that there is a fixed relationship between the width of the pulse and the angle so that the area of each of the constant amplitude variable pulses is equivalent to the corresponding sinusoidal segment. As a result, the application of this pulse train to a filter will produce at the output 400 Hz. sinusoidal wave having a very low harmonic content.

Other features believed characteristic of this invention are set forth in detail in the appending claims. The invention itself, however, together with many objects and advantages thereof will best be understood by reference to the following description taken in conjunction with the accompanying drawings in which:

FIG. 2a–2r shows waveform diagrams useful in understanding the operation of the inverter illustrated in FIG. 1.

Figure 1:
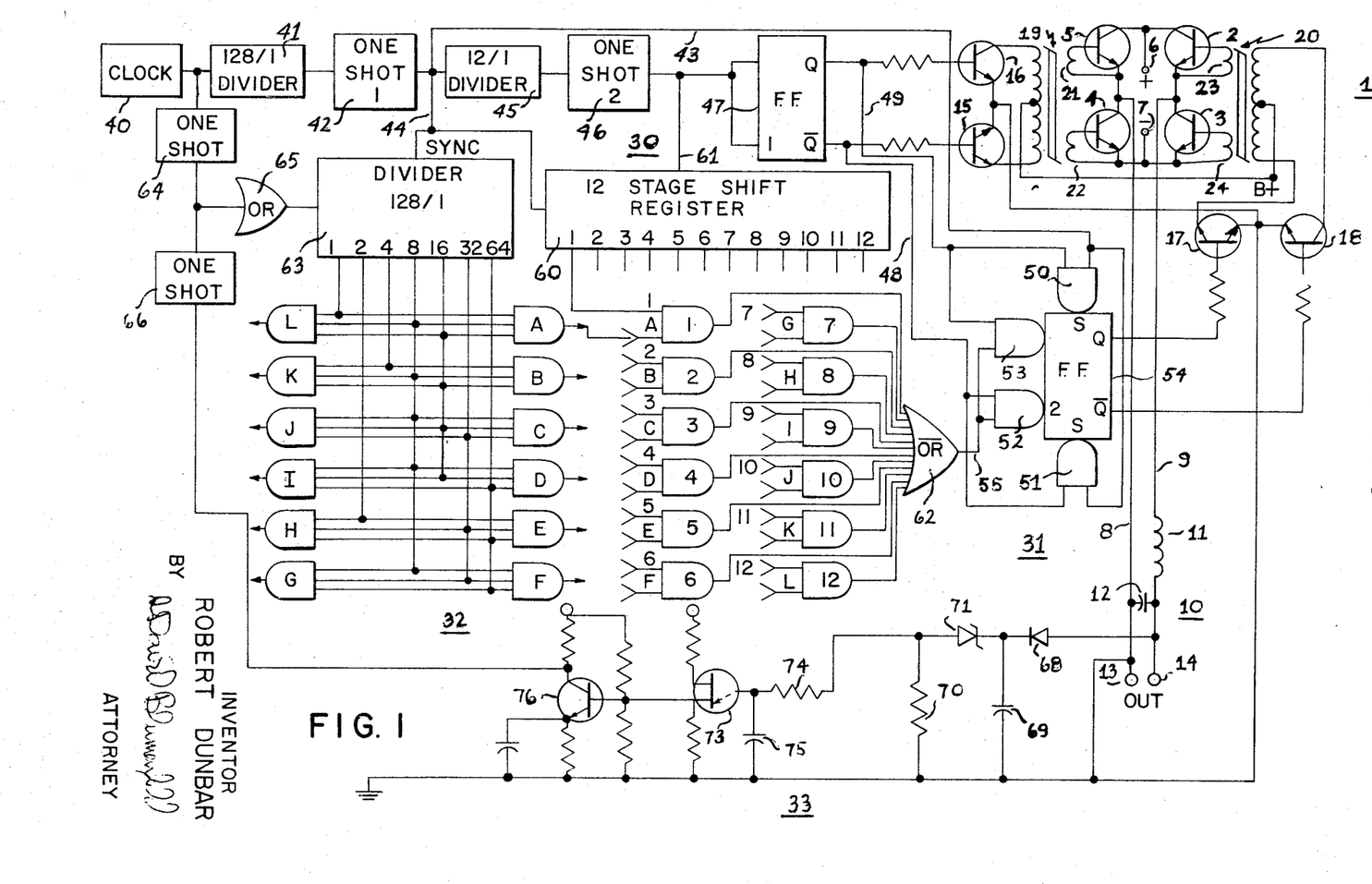
FIG. 1 is a block diagram of the DC to AC inverter of the instant invention and shows the circuitry for producing the switching of the bridge transistor to produce the variable width pulses.

FIG. 1 shows the DC to AC bridge inverter and the control and logic circuitry for producing the constant amplitude, variable width pulses which may be converted to a sinusoidal waveform. However, prior to describing the circuit of FIG. 1 in detail, it may be useful to discuss the underlaying theoretical considerations of the instant invention. By so doing, the manner in which the width modulated pulse train can be used to produce a sine wave output will be easily grasped and the reason that it has a low harmonic content will become clear. It is apparent that if one alternation of a sinusoidal waveform $$K = A \sin X$$

where $A$ = peak value of the sine wave $X = Wt$ is divided into $n$ equal segments, then each sinusodal segment subtends an angle $\phi$ which is defined by $\phi = 180°/n_{(2)}$ electrical degrees. The area under any sinusodial segment from $\alpha$ to $\alpha_2$ where $$|\alpha_2 - \alpha_1| = \phi$$

may be defined by the formula $$B = \int_{\alpha_1}^{\alpha} A \sin X dx \qquad (3)$$

It is obvious that from this formula the area under each sinusoidal segment varies with the angle. Knowing the area under each sinusoidal segment for each segment over the entire alternation, it is obvious that a constant amplitude rectangular pulse may be generated which has a width such that the area under the constant amplitude pulse is equal to the area of the corresponding sinusoidal segment. If the area under the rectangular pulse is equal to $WA$ where $W$ is the width of the pulse and $A$ is the amplitude of the pulse, (which is constant and equal to the peak amplitude of the sine wave) it is possible to determine the width of each of the pulses for the entire 180° since the areas under each constant amplitude pulse is to be equal to the area under the corresponding sinusoidal segment. The width of the pulse is now defined by the following equation:

$$WA = \int_{\alpha_1}^{\alpha_2} A \sin X dx \qquad (4)$$

$$W = \frac{1}{A} \int_{\alpha_1}^{\alpha_2} A \sin X dx = \cos X \Big|_{\alpha_1}^{\alpha_2} \qquad (5)$$

Solving equation (5), for each of the segments will establish the widths of the rectangular pulses necessary to produce a width modulated pulse train which is equivalent to a sine wave. For an arrangement in which each alternation of the sine wave is divided into 12 parts, i.e., where $n = 12$, the following tabulation will result:

| Segment | Value - w | Approx angle width in ° |
|---|---|---|
| 1. (0°–15°) | 0.0341 | ≈ 2 |
| 2. (15°–30°) | 0.0999 | ≈ 25.6 |
| 3. (30°–40°) | 0.1589 | ≈ 9.4 |
| 4. (45°–60°) | 0.2071 | ≈ 11.8 |
| 5. (60°–75°) | 0.2412 | ≈ 13.8 |
| 6. (75°–90°) | 0.2588 | ≈ 14.8 |
| 7. (90°–105°) | 0.2588 | ≈ 14.8 |
| 8. (105°–128°) | 0.2412 | ≈ 13.8 |
| 9. (120°–135°) | 0.2071 | ≈ 11.8 |
| 10. (135°–150°) | 0.1589 | ≈ 9.4 |
| 11. (150°–165°) | 0.0999 | ≈ 5.6 |
| 12. (165°–180°) | 0.0341 | ≈ 2.1 |

It will be noted from the table that the pulses vary as the angle of the sine wave increases from 0° to 90° and then decreases as the sine wave varies from 90° to 180°. It is possible from this tabulation to determine the duration of the conducting state of the complementary transistor in the bridge so that the desired variable width pulse train is produced with the widths of the pulses having the desired sinusoidal relationship.

FIG. 1 shows the manner in which this may be readily accomplished utilizing digital circuitry so that commercially available integrated digital circuits may be utilized thereby taking advantage of their small size and compactness. FIG. 1 illustrates a bridge type inverter shown generally at 1 which consists of four NPN-transistors 2, 3, 4 and 5 having their collector-emitter paths connected as the four arms of the bridge. A DC source having positive and negative terminals 6 and 7 is connected across one diagonal of the bridge and output leads 8 and 9 are connected across the other diagonal. Output leads 8 and 9 are connected to an L-C filter 10a consisting of an inductor 11 and a capacitor 12a for extracting the 400 Hz. sine wave from the varying width pulse train appearing at the bridge output. A pair of output terminals 13 and 14 is connected to the filter and to any suitable load or utilization circuit.

The transistors in the inverter bridge are energized in pairs so that transistors in the opposite arms of the bridge are simultaneously switched into the conducting state. Thus, transistors 3 and 5 are normally conducting together as are transistors 2 and 4. With transistors 3 and 5 in the conducting state, terminals 6 and 7 are connected respectively (with the polarity shown) to output leads 8 and 9. With transistors 2 and 4 conducting the polarity of the voltage at output leads 8 and 9 is reversed. Thus, the transistor pairs conduct alternately to produce the opposite alternations of the sine wave.

The transistor pairs are controlled by associated drive circuits comprising of NPN-transistors 15 and 16 for transistors 4 and 5 and transistors 17 and 18 for transistors 2 and 3. These drive transistors are coupled to the inverter transistors through saturable transformers shown generally at 19 and 20. Thus, drive transistors 15 and 16 are coupled through the primary winding of transformer 19 to a pair of secondary windings 21 and 22 which are connected across the base-emitter junctions of transistors 5 and 4 respectively. Similarly, transistor 17 and 18 are coupled through the primary winding of saturable transformer 20 and the secondary windings 23 and 24 across the base-emitter junctions of transistors 2 and 3 respectively. Whenever a drive transistor is in the conducting state, it drives its associated transformer to saturation to invert or "chop" the DC voltage appearing at terminals 6 and 7. The drive transistors are operated in pairs so that transistors 16 and 17 and 15 and 18 are actuated simultaneously to drive the selected inverter transistor pairs into conduction.

Transistors 4 and 5 are alternately driven into conduction at the desired repetition rate and maintained in the conducting state during the entire negative and positive alternations respectively. Transistors 2 and 3, on the other hand, are turned on and off $n$ times during each alternation to produce the variable width pulses. The duration of each conducting interval of transistor 2 and 3 is, as has been pointed out previously, controlled to vary the width of the output pulse during each alternation so that the widths vary sinusoidally. In describing the circuit of FIG. 1, the circuit will be described in terms of producing sinusoidal output of 400 Hz. and with $n$ being chosen so that $n = 12$; i.e., each alternation is broken up into 12 intervals. It will be obvious however, that the instant invention is not limited to producing a 400-Hz. sinusoidal output nor is it limited to an arrangement in which 12 variable width pulses are generated to produce each alternation of the desired output sine wave. It will also be obvious that the greater the number of segments in each alternation, the greater fidelity of the reproduced sine wave, while on the other hand, the greater the number of intervals the more complex and expensive the logic circuitry becomes. Obviously, for each situation, there is an engineering compromise between the fidelity of the output waveform and the complexity of the circuit.

The logic and control circuitry for the transistors of the inverter bridge 1 consists of four main components. The first of these is a fundamental frequency bridge switching network shown generally at 30 for generating control signals which switch transistors 4 and 5 on and off at the fundamental 400-Hz. frequency to establish the period of the positive and negative alternation of the output sine wave. In addition, there is a turn-on, turnoff switching network 31 for controlling drive transistors 17 and 18 to switch the complementary transistors 2 and 3 into conduction $n$ times during each alternation and *thereafter to turn these transistors off at differing but a predetermined times during each of the n-segments to produce the variable width constant amplitude pulses.* In addition, there is a turnoff signal generating network 32 which generates a turnoff pulse during each interval to terminate conduction of the complementary transistors 2 and 3 at predetermined time after they have been driven into the conducting state. Network 32 consists of a first set of 12 AND gates which are controlled by a shift register to enable each of these AND gates during one of the 12 intervals making up each alternation. In addition, a further set of 12 AND gates is provided which are controlled by a timing network comprising a divider and a clock pulse input to produce an output pulse from each gate after a predetermined count. The outputs from this second set of AND gates are coupled to the inputs of the first set of AND gates and thus produce a turnoff pulse from each of the first set of AND gates whenever the predetermined counts are reached during each interval. The counts are chosen to produce a turnoff pulse at a different time during each interval, to produce the constant amplitude variable width pulses which are sinusoidally related.

In addition, a voltage regulating feedback network 33 is provided between output terminals 13 and 14 and network 32 to control the turnoff pulses to vary the amplitude of the sinusoidal output voltage in such a manner as to maintain it at a constant predetermined level. The voltage regulator produces a pulse train which varies as a function of the output signal amplitude and these pulse trains are combined with the clock pulses applied to the second set of AND gates to control the turnoff signal outputs from these AND gates.

FUNDAMENTAL FREQUENCY BRIDGE SWITCHING NETWORK

Network 30 which controls transistors 4 and 5 to drive them alternately into conduction at the desired 400-Hz. rate, includes a source of clock pulses 40 which provide the common timing or clock pulses for this network as well as the remaining control and logic circuitry. The output from the clock pulse generator, which may be a crystal controlled oscillator or the like, is a 1.288-MHz. pulse train which is applied to a frequency divider 41 which divides the clock pulses by 128 to produce at its output a 9.6-KHz. square wave. The 9.6-KHz. square wave is applied to a One-Shot multivibrator 42, which in effect, differentiates the square wave to produce a train of 9.6-KHz. trigger pulses. A One-Shot multivibrator is a well-known device consisting of two interconnected conducting elements such as transistors which has but a single stable state with one transistor conducting and the other transistor cutoff. Upon application of a triggering pulse, in this instance, the positive going edge of the square wave from divider 41, the stable state of the One-Shot is reversed. The One-Shot returns to its original state a given time after being triggered, with the time being controlled by the time constant of the components of the circuit, and remains in the state until the appearance of the next triggering pulse. Thus, a One-Shot typically produces a very narrow output pulse in response to the incoming pulse and consequently, the 9.6-KHz. square wave appearing at the output of divider 41 is converted into a train of narrow triggering pulses having the same repetition rate.

The 9.5-KHz. pulses are utilized both to control conduction of transistors 4 and 5 of the bridge and to establish 12 time intervals during each alternation of the 400-Hz. signal during which twelve variable width, constant amplitude pulses are generated. That is, since the period of a 9.6 KHz. wave is one-twelfth the period of each alternation of a 400-Hz. wave, the 9.6-KHz. signal is utilized to generate the turn-on, turnoff signals 12 times per alternation. The 9.6-KHz. signal is applied is applied to switching network 31 over lead 43 and function as a triggering signal to drive transistors 17 and 18 and complementary transistors 2 and 3 into conduction 12 times during each alternation. The 9.6-KHz. signal is also applied over lead 44 to turnoff signal generating network 32, presently to be described.

The output from One-Shot 42 is applied to a 12 to one divider 45 to produce an 800-Hz. square wave which is differentiated in One-Shot 46 to produce 800-Hz. triggering pulses which are utilized to control flip-flop 47. Flip-flop 47 selectively energizes drive transistors 15 and 16 to switch transistors 4 and 5 alternately into conduction. The 800-Hz. pulses from One-Shot 46 are applied to both input terminals of flip-flop 47 while transistors 15 and 16 are respectively connected through suitable current limiting resistors to the Q and not—Q output terminals of flip-flop 47. Flip-flop 47 is a J-K flip-flop which, as is well known, is a device characterized by the fact that the application of a triggering pulse causes the respective outputs to reverse their previous states. Thus, the application of triggering pulse to the J terminal will cause the Q output terminal to assume the high or logic ONE condition if the condition of the terminal was previously at the low or logic ZERO condition. Similarly, a triggering pulse applied to the K terminal will cause the NOT-Q terminal to assume the high or a logic ONE condition if and only if it was previously in the low or logic ZERO condition. It will be thus obvious that the Q and NOT-Q output terminals of flip-flop 47 are alternately switched to the high or logic ONE condition to switch drive transistors 15 and 16. The sequence is typically as follows: Assume that the Q terminal is initially at the high or logic ONE condition and the NOT-Q terminal is at low or logic ZERO Condition. The next triggering pulse from One-Shot 46 is applied to both input terminals. The pulse reverses the state of the flip-flop causing the Q terminal to go to the low or logic ZERO condition and the NOT-Q terminal to go to the high or logic ONE condition. The appearance of the next input pulse reverses the state of the outputs at the Q and NOT–Q terminals. It is obvious that it requires two pulses from One-Shot 46 to drive the outputs from flip-flop 47 through one cycle. As a result, the 800-Hz. pulses switch inverter bridge transistors 4 and 5 at a 400-Hz. rate.

The output from the Q and NOT–Q terminals are also applied over leads 48 and 49 to turn-on, turnoff control network 31 as enabling signals for AND-gates 50–53. These AND gates control turn-on and turn-off flip-flop 54 to switch drive transistors 17 and 18 and complementary transistors 2 and 3 into conduction 12 times per alternation. Thus, it can be seen that inverter transistors 4 and 5 are selectively gated into conducting state for an interval equal to one alternation of a 400 Hz. wave while complementary transistors 2 and 3 are switched on and off 12 times per alternation to produce the variable width pulse train.

TURN-ON, TURNOFF SWITCHING NETWORK FOR THE COMPLEMENTARY TRANSISTORS

As pointed out above, the complementary transistors 2 and 3 in the inverter bridge are turned on and off 12 times during each alternation to produce a variable width pulse. That is, complementary transistor 3 is turned on and off 12 times during the positive alternation when its associated transistor 5 is conducting and transistor 2 is turned on and off 12 times during the negative alternation when its associated transistor 4 is conducting.

Thus, if the Q output from flip-flop 47 is at its high or logic ONE level thereby switching drive transistor 16 and transistor 5 into the conducting state, complementary transistor 3 will be turned on and off 12 times during this interval with the turnoff time for each interval being varied sinusoidally. The logic and control circuits shown at 31 generate the turn-on and turnoff signals for drive transistors 17 and 18 to produce the variable width pulses at the output of the bridge. Thus, logic circuit 31 includes the pair of turn-on AND-gates 50 and 51 which are controlled in response to the output from the Q and NOT–Q terminals of flip-flop 47 and the 9.6-KHz. output from One-Shot 42 in inverter control circuit 30. The circuit also includes a pair of turnoff AND-gates 52 and 53 which are controlled in response to the output from the Q and NOT–Q terminals of flip-flop 47 and from the Turnoff Signal Generating Network 32. AND-gates 50–53 are respectively connected to the preset, clear, K and J inputs of flip-flop 54. These, in turn, control the Q and NOT–Q output terminals which respectively switch the conducting states of drive transistor 18 and 17. That is, if the Q terminal is at the high or logic ONE condition, drive transistor 17 is switched into conduction and correspondingly drives complementary inverter transistor 3 into conducting state. If the NOT–Q terminal is at the high or logic ONE level, then drive transistor 18 is switched into conduction and complementary transistor 2 is in the conducting state thereby reversing the polarity of the voltage across output leads 8 and 9. The turn-on AND-gates 50 and 51 respectively control flip-flop 54 in such a manner that an output from AND-gate 50 results in a high or logic ONE condition at the Q terminal whereas an output from AND-gate 51 results in high or logic ONE state at the NOT–Q terminal. The turnoff AND gates 52 and 53, on the other hand, are connected to J and K terminals so that an output from AND-gate 52 changes the state of the NOT–Q output from the high or logic ONE condition to the low or logic ZERO condition. Similarly, an output from turnoff AND-gate 53 changes output from Q terminal from the high or logic ONE condition to the low or logic ZERO state thereby turning off its associated drive transistor.

The outputs from the Q and NOT–Q terminal of flip-flop 47 selectively enable one turn-on and one turnoff AND gate during each alternation. Thus, lead 49 from the Q terminal of flip-flop 47 is connected as one input to turn-on AND-gate 50 and as one input to the turnoff AND-gate 53. When the Q terminal of flip-flop 47 is at its logic ONE condition, a condition which causes transistor 5 in the inverter bridge to be in the conducting state, only AND-gates 50 and 53 are enabled while AND-gates 51 and 52, which are connected to the NOT–Q terminal flip-flop 47 through lead 48 are disabled. Hence, AND-gates 50 and 53 control complementary transistor turning it on each time that a 9.6-KHz. triggering pulse from lead 43 is applied to the other input terminal of AND-gate 50, turning it off whenever a turnoff pulse is applied over lead 55 to the other input of AND-gate 53. During the interval when the output on lead 49 is from the Q terminal of flip-flop is high, the output from the NOT–Q terminal applied over lead 48 to AND-gates 51 and 52 is low, thereby disabling these AND gates and the application of the 9.6-KHz. triggering signals from lead 43 and the turnoff signals on line 55 have no effect on these AND gates and will not affect flip-flop 54. Thus, network 31 contains logic circuitry which switches the complementary transistors 2 and 3 on and off 12 times during each alternation in response to the 9.6-KHz. triggering signals and the turnoff signals from network 32 to produce 12 positive variable width, constant amplitude pulses at the output of the inverter.

Similarly, AND-gates 51 and 52 are enabled when the NOT–Q output of flip-flop 47 is at its high or logic ONE level so that transistor 2 conducts for the entire negative alternation and transistor 4 is turned on and off 12 times by AND-gates 51 and 52 and flip-flop 54 to produce 12 negative, variable width, constant amplitude pulses.

TURNOFF SIGNAL GENERATING NETWORK

The turnoff signals are generated in a network shown generally at 32. The turnoff pulses are generated at varying times during each of the 12 intervals that the complementary transistors of the bridge are turned on. To this end, the time period for each alternation is divided into 12 equal intervals by means of a 12-stage shift register 60 controlled by the 9.6-KHz. output pulse train from One-Shot 42. The 12 stage shift register contains twelve individual output terminals which are connected respectively to one input of each of 12 AND-gates 1-12 so that the AND gates are sequentially enabled in response to successive output pulses from One-Shot 42. The pulses when applied to the input of the shift register over lead 44 cause the register to shift so that a voltage of suitable polarity and level appears successively at the output of the shift register to apply an enabling voltages to the 12 AND gates. At the end of the twelfth pulse, an 800-Hz. reset pulse is applied to the shift register from One-Shot 46 to recycle the register.

Each of the 12 output terminals from the shift register is connected as one input to AND-gates 1–12 and these gates are sequentially enabled by the shift register as it goes through its 12-stage count. Thus, the first pulse to the shift register raises the voltage level at output terminal 1. This enables AND-gate 1 and it produces a turnoff signal whenever a voltage of suitable polarity is applied to its A input terminal. Similarly, the other output terminals of the shift register are connected respectively to the remaining AND gates so that these AND gates are successively enabled during a selected interval of the twelve intervals in making each alternation. The outputs of AND-gates 1–12 are connected to an OR-gate 62, the output of which is connected through leads 55 to turnoff gates 52 and 53. The OR gate, as is characteristic of such devices, produces an output whenever an input of a suitable polarity and level appears at any one of its 12 input terminals. Thus, as each of AND-gates 1–12 produces an output, a turnoff pulse is applied from OR-gate 62 to turnoff gates 52 and 53.

The other inputs of AND gates 1–12 are energized from a timing network which produces output signals during each of the 12 intervals signals which vary sinusoidally with time to produce the turnoff pulses which vary correspondingly in time. To this end, a second set of 12 AND-gates A-M is provided, the outputs of which are connected respectively as inputs to the AND-gates 1–12. The outputs from AND-gates A-M occur at predetermined, different periods of time after the beginning of each of the 12 intervals to generate the desired turnoff pulse. AND-gates A through M are 3 input AND gates and are connected to the output terminals of a 128–1 divider 63 which is controlled by the clock pulses from 1.288-MHz. clock 40. The clock pulses for divider 63 are applied to One-Shot 64 which converts the 1.288-MHz. clock pulses to a very narrow triggering pulses which are applied as one input to an OR-gate 65. OR-gate 65 produces an output pulse which is applied to the divider in response to each of the triggering pulses. The other input to OR-gate 64 is from One-Shot 66 which forms part of the voltage regulating circuit which will be described in greater detail presently. Since the repetition rate of the pulses applied to shift register 60 from One-Shot 42 is 1/128th of the clock pulse rate (having been divided by 128 in divider 41), it will be apparent that divider 63 goes through a complete 128 pulse count during each of the 12 intervals constituting the shift register cycle. The divider therefore produces a count at its output terminals (which are designated in the binary notation, i.e., 1, 2, 4, 8, 16, 32 and 64) which ranges from 1 through 128 during each of the 12 time intervals of shift register 60. AND-gates A through M are connected to output terminals 1, 2, 4, 8, 16, 32 and 64 of the divider in such a manner that the output terminals of the divider are at the proper voltage levels to actuate each of the gates whenever the divider reaches a predetermined count. Consequently, each of the AND gates produces an output pulse only after divider 63 has counted a predetermined number of pulses. For example, AND-gates 1 and 7 are respectively connected to the 2, 8 and 16 terminals of the divider so that the inputs to both of these gates are of the proper polarity and level to produce an output from the gate whenever the divider received and counted 25 pulses. At all other times, the polarity and levels at the inputs are such that there is no output from this gate. Each of the AND-gates B through M similarly produces an output pulse after a selected count. These output pulses from AND-gates A–M are then applied to the input terminals of AND-gates 1 through 12 to produce a turnoff pulse which varies in time for each of the 12 intervals. The counts for each of the AND gates associated with the divider 63 are so chosen that each turnoff pulse occurs at a time sinusoidally related to the angle in electrical degrees represented by the particular interval.

AND-gates A through F produce turnoff pulses for the 15° intervals from 0 to 90 electrical degrees and AND-gates 6 through 12 produce turnoff pulses for the six intervals from 90 to 180°. Since the sine wave is symmetrical about 90°, it will be noted that the count to which the AND gates respond are such that AND-gate A and AND-gate M respond to the same count. AND-gate B and AND-gate L respond to the same count, and so on, so that the width of the output pulses from the inverter are symmetrical about 90°. It will also be apparent that although there is an output from each of AND-gates A through M during each of the 12 intervals established by register 60 (i.e., 12 turnoff signals are produced during each interval), only one turnoff signal from these gates is effective since only one of AND gates is enabled by shift register 60 during each interval. That is, AND-gate A is connected as a second input of AND-gate 1 associated with shift register 60. AND-gate 1 is enabled by the shift register only during the first interval and produces an output pulse when AND-gate A produces a pulse on the 26th count. AND-gate A also produces a pulse on the 25 th count during the second and subsequent intervals, which are applied to the A terminal of AND-gate 1. However, there is no output from AND-gate 1 during the second and subsequent intervals since the voltage level at terminal 1 of the shift register 60 is such that AND-gate 1 is disabled. During the second interval, only AND-gate 2 is enabled by the output from shift register 60 and it will produce an output count when AND-gate B produces an output. It can be seen therefore, that the combination of divider 63 and AND-gates A through M produce pulses which selectively actuate AND-gates 1 through 12 to produce the turnoff pulses from OR-gate 62. The turnoff pulses switch flip-flop 54 so that complementary transistors 2 and 3 in the bridge inverter are turned off at varying times during each interval to produce at the output of the bridge a succession of constant amplitude, variable width pulses with the width of the pulses being sinusoidally related to the angle in electrical degrees.

THE VOLTAGE REGULATOR CIRCUIT

A voltage regulator circuit is included to control the amplitude of the output sine wave and maintain it at a predetermined level. The sine wave at the output terminals 13 and 14 is applied to a network which produces a train of pulses, the repetition rate of which is proportional to the output level. The pulses are applied through One-Shot 66 to OR-gate 65 which controls divider 63 and are added to the clock pulse trains which are applied to the other input of OR-gate 65. Consequently, the number of pulses applied is selectively increased or decreased to divider 63 thereby increasing or reducing the width of the inverter output pulses by causing the turnoff pulse to occur either earlier or later in time than normal. The output voltage is applied to a rectifier 68 which is poled to rectify the positive alternations of the sine wave and produces a positive voltage across shunt capacitor 69 of a magnitude proportional to the amplitude of the sine wave. A zener diode 71 is connected between capacitor 66 and a shunt resistor 70 and establishes a reference voltage to which the voltage across capacitor 69 is compared. Consequently, the voltage across resistor 70 is proportional to the difference between the voltage Vc across capacitor 69 and the constant voltage Vz across the Zener, so that the voltage Vr across the resistor is:

$$V_R = V_c - V_z$$

This voltage is applied to a relaxation oscillator 72 consisting of a unijunction transistor 73 and a timing network consisting of the resistor 74 and a shunt capacitor 75 connected in series. The emitter of unijunction 73 is connected to the junction of resistor 74 and capacitor 75. Capacitor 75 charges towards the voltage $V_R$ established across resistor 70. Whenever the voltage across capacitor 75 exceeds the intrinsic standoff ratio at the emitter-base junction of unijunction 73, transistor 73 fires and produces an output pulse at one of its base electrodes. When unijunction transistor 73 fires, capacitor 75 is discharged and the unijunction is again driven into the nonconducting state. The cycle then again repeats with capacitor 75 charging towards $V_R$ until the transistor fires and produces another pulse. It is obvious that the voltage level $V_R$ across resistor 70 controls the rate at which the unijunction transistor fires and the pulse rate from the relaxation oscillator. That is, as $V_R$ increases, the voltage across capacitor 75 will reach the firing voltage earlier, thereby increasing the repetition rate of the output pulses from the oscillator whereas a drop in the voltage across resistor 70 causes voltage across capacitor 75 to reach the firing voltage later, reducing the pulse rate. The pulses are applied to the base of transistor amplifier shown generally at 76 and coupled to One-Shot 66 and thence to OR-gate 65. Thus, the output pulses from the voltage regulator circuit are added to the clock pulses which are applied to the OR gate thereby causing the count of the divider to reach the preset counts for the AND gates earlier or later depending on the amplitude of the sinusoidal output signal from the inverter. Consequently, the width of the pulses is selectively varied to control the amplitude. Since these regulating pulses from network 72 are added to the divider during each of the 12 intervals, constituting the alternation of the signal, it will be apparent that each of the 12 pulses which are converted to a sinusoidal alternation will be reduced by the same percentage, thus maintaining true sinusoidal distribution and minimizing harmonic distortion in the final sine wave while at the same time, maintaining amplitude regulation.

OPERATION

Figure 2:
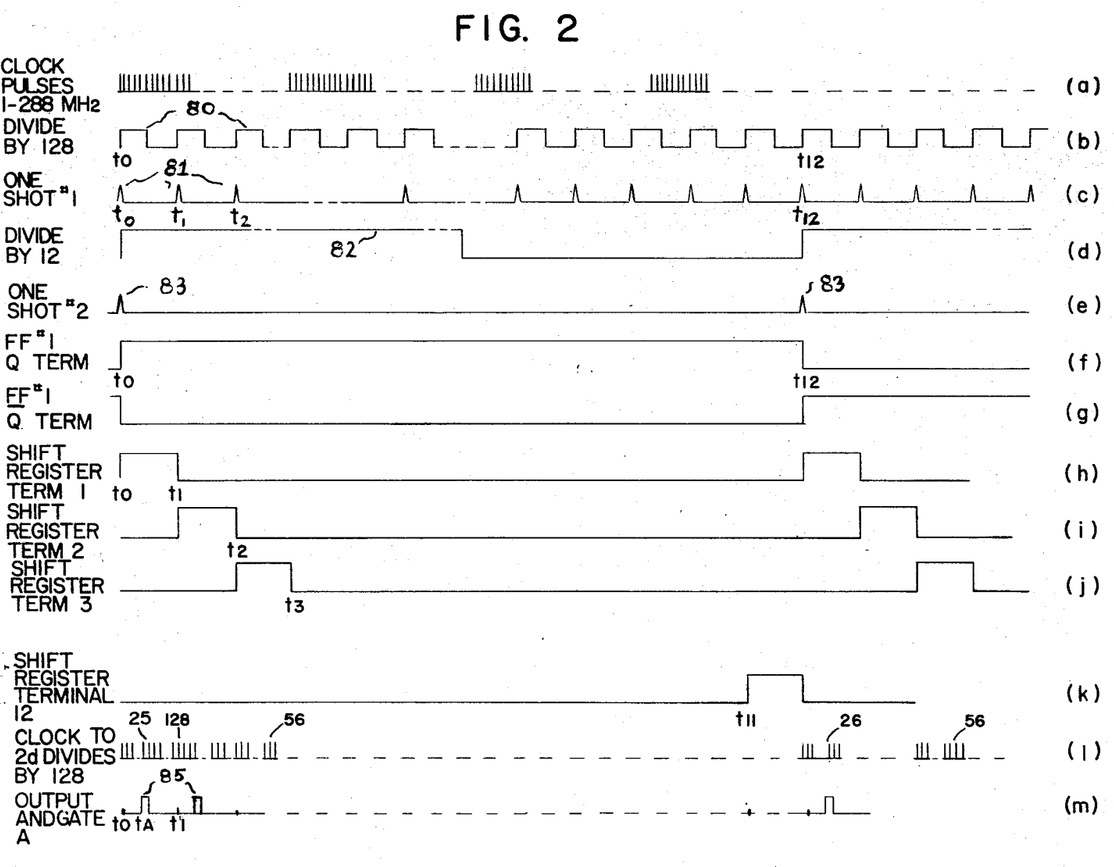

The manner in which the circuit illustrated in FIG. 2 operates to produce a sine wave output from a bridge inverter by producing a constant amplitude variable width pulse train, may be most easily understood in connection with the timing wave from diagrams of FIG. 2. The 1.288-MHz. clock pulses shown in FIG. 2a are applied to divider 41 and produce the 9.6-KHz. square wave 80 shown in FIG. 2b. This square wave is applied to One-Shot and the positive going leading edges of the square wave triggers the One-Shot causing it to change from its normal state. However, it reverts to its stable state shortly thereafter and remains in this state until the next positive leading edge. Hence, a pulse train such as illustrated in FIG. 2c is produced at the output of One-Shot 42. These pulses are applied to divider 45 which divides by 12 to produce a square wave output 82, shown in FIG. 2d having an 800-Hz. repetition rate. The square wave from divider 45 is impressed on One-Shot 46 to produce an 800-Hz. pulse train 83, shown in FIG. 2e. These pulses are produced by the positive going leading edge of the square wave from divider 45. Pulses 83 are utilized to switch flip-flop 47 which controls the inverter bridge as well as providing reset pulses for shift register 60 in the turnoff pulse generating circuit. Thus, as shown in FIG. 2f at $t_0$ the first positive triggering pulse 83 when applied to the J and K terminals of flip-flop 47 drives the Q terminal to the high or logic ONE level and, as shown in FIG. 2g, simultaneously drives the NOT–Q terminal to the low or logic ZERO level. The output terminals of flip-flop 47 remains in this condition until the appearance of the next triggering pulse at time $t_{12}$, at which time, the Q terminal is driven to the low or logic ZERO state and the NOT–Q terminal is driven to the high or logic ONE state. At the time $t_0$, when the Q terminal goes to the high or logic ONE state, transistor 16 is driven into saturation and through saturable transformer 19 drives bridge transistor 5 into the saturated state. Bridge transistor 5 will therefore be in the conducting state and remain so during the entire interval from $t_0$ to $t_{12}$ which represents a period of one alternation of a 400-Hz. wave.

Since the output from the Q terminal of flip-flop 47 is also applied to one input of turn-on AND-gate 50 of flip-flop 54, and to one terminal of turnoff AND-gate 53. These two AND gates are enabled during the entire time interval from $t_0$ to $t_{12}$ to successively switch the Q output of flip-flop 54 between logic 0 and logic ONE state to turn on the complementary transistor 3 of the bridge on and off. During this interval, transistors 5 and 3 of the bridge inverter are in the conducting state, with complementary transistor 3 being successively turned on and off to produce 12 positive constant amplitude, variable width output pulses across output leads 8 and 9. During the same interval, as shown in FIG. 2g, the output from the NOT–Q terminal of flip-flop 47 is at the low or ZERO logic state thereby disabling AND-gates 51 and 52 associated with the flip-flop 54. The manner in which the varying turnoff pulses are generated 12 times per alternation to produce the variable width pulses may be most readily understood in connection with FIGS. 2g to 2r.

Pulses 81 from One-Shot 42 shown in FIG. 2c, are also applied over lead 44 to the input of shift register 60 causing the register to shift so that at $t_0$ a positive going voltage appears at output terminal 1 of the shift register thereby enabling AND-gate 1 associated with that register. The voltage at terminal 1, as shown in FIG. 2h, remains positive and the gate remains enabled until time $t_1$ when the second pulse 81 from One-Shot 42 is applied to the shift register. This shifts the positive output voltage to terminal 2 so that at time $t_1$ the voltage at terminal 1 goes to 0 and the voltage at terminal 2 goes positive. The voltage at terminal 2, as shown in FIG. 2i, stays positive until the application of the next pulse at $t_2$ when the voltage at terminal 3 goes positive (FIG. 2g) and terminal 2 returns to 0. This sequence continues and Gates 1–12 are successively enabled. After the 12th pulse, at time $t_{12}$, a triggering pulse 83 from One-Shot 46 (as shown in FIG. 2e) is applied to the shift register over lead 61 and resets the shift register. Output terminal 1 of the shift register again goes positive and the remaining terminals remain at 0 or low potential. Thus, it can be seen during each interval from $t_0$ to $t_{12}$, when one pair of bridge transistors is driven into conduction, each of the AND-gates 1 through 12 is sequentially enabled to produce an output pulse for turning off the complementary transistor in the bridge if an input signal is applied to the second terminal of each of the AND gates 1.288-MHz. clock pulses which are applied to divider-counter 63 from One-Shot 66 are shown in FIG. 2l. Although not apparent from FIG. 2l, they are substantially narrower than the clock pulses of FIG. 2a. 128 clock pulses are applied to the divider during each of the intervals from $t_0$ to $t_1$, $t_1$–$t_{21}$ etc. In other words, the divider counts (divides) 128 pulses during each of the 12 intervals making up the sine wave alternation. As the divider counts the incoming clock pulses, the AND-gates A–M associated with the dividers are selectively actuated to produce an output, with the output being determined by the number of counts for which the gate is set. Thus, as illustrated in FIG. 2m, AND-gate A is connected to the terminals of the divider in such a manner that at the 25th pulse during each interval, the inputs to gates A and M are of the proper level to produce an output from each of these gates. The outputs from these gates is represented by a pulse 85 occurring at a time A where time $t_A$ is equal to $25/128 \times (t_1 - t_0)$. This obviously represents an angle in electrical degrees since the time interval from $t_0$ to $t_1$ represents 15 electrical degrees (180 12). The output pulse 85 from AND-gate A is applied to the A terminal of AND-gate 1 to produce a negative going output pulse 86 shown in FIG. 2o at time $t_A$. The pulses produced at the output of AND-gate A at times other than the $t_0 - t_1$ interval do not produce an output from AND-gate 1 since, as can be seen from FIG. 2h, the other input to AND-gate 1 is no longer enabled since the voltage at shift register terminal 1 is now at its low value.

Similarly, AND-gate C as shown in FIG. 2n, produces an output pulse 87 at the 56th count during each interval, which pulse is supplied to AND-gate 3. However, since the other input to AND-gate 3 is connected to terminal 3 of the shift register gate 3 is not enabled during intervals $t_0$–$t_1$, and $t_1$–$t_2$ so there is no output from AND-gate 3. It is not until the interval $t_2$–$t_3$ that the output from AND-gate C at the 56th count is effective to produce an output pulse 88 from AND-gate 3. Pulse 88 is then applied to OR-gate 62 to produce the turnoff pulse. OR-gate 62, on the other hand, having an input from each of AND-gates 1–12 produces a sequence of pulses as each of AND-gates 1 through 12 is successively enabled and produces an output pulse. Thus, as shown in FIG. 2q, there is a turnoff pulse 89 from OR-gate 62 at the time $t_a$ during the first interval and at the time $t_c$ during the third interval, and similar pulses, not shown, appear at the output of OR-gate 62 during each of the intervals with the position of the pulses during the intervals being distributed sinusoidally in time.

Figure 3:
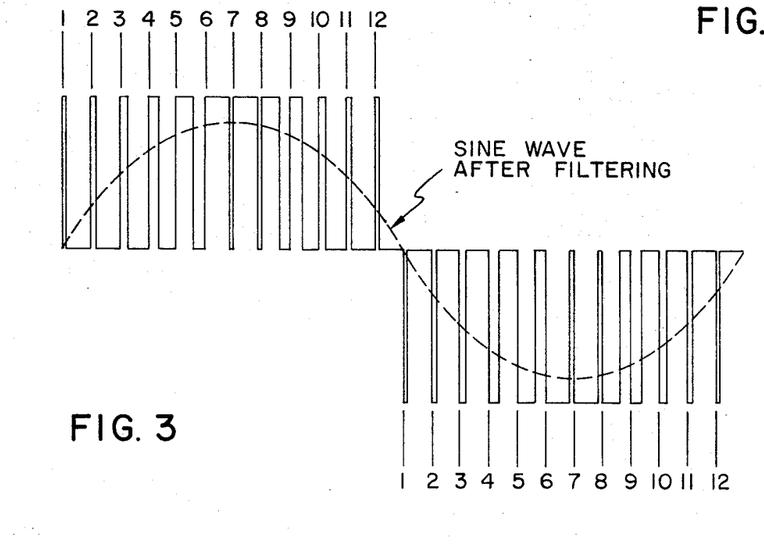
FIG. 3 is a waveform diagram showing sine wave produced from the variable width pulses.

As was pointed out previously, the 9.6-KHz. pulses 81 shown in FIG. 2c are applied to the turn-on gates 50 and 51 at $t_1, t_2, -- t_{12}$ and establish the beginning of each of the 12 intervals which constitute one alternation of the sine wave. Each of these pulses initiates triggering of the complementary transistors into conduction. That is, at $t_0$ the Q terminal of flip-flop 54 goes to its high state driving transistors 17 and 3 into saturation. The transistor remains in the saturated state until time $t_A$ when the first turnoff pulse 89 from negative OR-gate 62 is applied to the input of turnoff AND-gate 53 which is enabled by the high or logic ONE output of the Q terminal of flip-flop 47. The appearance of this turnoff pulse produces an output from turnoff gate 53 which is applied to the flip-flop and switches Q terminal output of flip-flop 57 to the low or logic ZERO state driving complementary transistor 3 into the nonconducting state. Therefore, during interval $t_0 - t_1$ a pulse having a width equal to $t_a - t_0$ is produced at the output of the inverter bridge. During the succeeding cycles, complementary transistor 3 is turned on at the beginning of each of the 12 intervals by the triggering pulses 81. The turnoff pulse, on the other hand, comes at different positions in time since these pulses, as pointed out previously, vary sinusoidally in time. Thus, as shown in FIG. 2r during the third interval $t_0 - t_3$, the Q terminal of flip-flop 54 goes high at $t_2$ and transistor 3 is again turned on. It remains in the conducting state until the appearance of the turnoff pulse from OR-gate 62 at a time $t_c$. At this time, the complementary transistor is turned off again and the inverter has produced an output having a duration equal to $t_c - t_2$ which as can be seen from FIG. 2r is wider than the first pulse. As may be seen most clearly from FIG. 3, the inverter produces a train of 12 positive pulses, (shown as 1 through 12 in FIG. 3) and a train of 12 negative pulses, the pulses being of constant amplitude and varying width. Each pulse has an area which is equal in area to the corresponding sinusoidal segment which it represents. That is, the interval representing each alternation of the desired sine wave has been broken up into 12 equal intervals of 15 electrical degrees each, and the width of each pulse in the interval is varied so as to make the area under the corresponding sinusoidal segment. When these pulse trains are applied to a simple LC filter such as shown in FIG. 1, the output from the filter will be a sine wave such as the one shown in 87 since the sum of the areas of all the pulses exactly equals the sum of the area under the positive and negative alternations of the sine wave respectively.

It will be appreciated from the above discussion that a circuit has been described for converting DC to AC of a sinusoidal waveform by means of a transistor bridge inverter and digital control circuitry which produces a train of constant amplitude varying width pulses to simulate the desired sinusoidal wave shape. It will be apparent however, that although a system for producing a sinusoidal wave form has been described that the invention is equally applicable to generating any time repetitive, varying waveform by means of generating these width modulated pulse trains. As long as the time varying waveform is repetitive, the waveform may be divided up into $n$ intervals and a variable width pulse may be generated, the area of which is equivalent to the corresponding area under the time varying waveform. This pulse train then may be filtered or otherwise suitably processed to extract the desired time varying waveform from the pulse train.

Thus, while one particular embodiment of the invention has been shown and described, it will, of course, be understood that the invention is not limited thereto since the modifications may be made in the arrangement shown and employed, and it is contemplated in the appended claims to cover any such modifications as fall in the true spirit and scope of the invention.

I claim:

1. A DC to AC inverter for producing a time varying output waveform from a unidirectional supply comprising,
   a. a source of unidirectional voltage,
   b. bridge switching means comprising a plurality of switching devices connected in the arms of the bridge, said source of unidirectional voltage being coupled across one diagonal of said bridge,
   c. means for selectively actuating said switching devices in pairs to produce opposite alternations of the time varying output wave,
   d. pulse width modulating means including means to generate switching pulses for said switching devices to produce a plurality $n$ of constant amplitude, variable width, pulses during the period of each alternation of the time varying output wave, including
      1. A first switching path for switching one of the switching devices in each pair at a rate equal to the desired output frequency of the wave,
      2. A second switching path for switching the other switching device in each pair on and off at $n$ times the rate of said one switching device to produce $n$ output pulses during each alternation, including means to produce $n$ switching pulses for turning on said switching devices,
      3. Means to vary the time said other switching device is turned off to vary the width of the pulses including means to generate $n$ switching pulses for turning off said switching devices, the time interval between each turn on and each turnoff switching pulse varying selectively to vary the width of the output pulses so that the area of each pulse is substantially equal to the area of the corresponding segment of the desired varying wave.

2. The inverter according to claim 1 wherein said wave is a sinusoidal wave and the area of each of said variable width pulses is equal to the area of a corresponding sinusoidal segment where each sinusoidal segment in each alternation is defined by an angle in electrical degrees equal to 180° over $n$.

3. The inverter according to claim 2 including,
   a. a source of clock pulses
   b. means in said first path for producing first switching pulses from said clock pulses having a repetition rate equal to the desired output frequency,
   c. means for producing further switching pulses from said clock pulses having a repetition rate $n$ times the rate of said first switching pulses for turning the other switching device in each pair on to drive it into conduction $n$ times per alternation
   d. means for producing a turnoff switching pulse in response to said clock pulses a predetermined time after each of said further switching pulses to turn said other devices of $n$ times per alternation, said predetermined time being chosen to vary the width of the output pulses so that the area of each pulse equals the area under a corresponding segment of the sinusoidal wave.

4. The inverter according to claim 3 wherein said means for producing the turnoff switching pulses includes a first group of $n$ AND gates, means for successively enabling each of the $n$ AND gates during each alternation, means to generate $n$ timing pulses at varying times after the AND gates are enabled, means to impress said timing pulses to the individual AND gates to produce successive turnoff pulse from said AND gates which vary in time.

5. The inverter according to claim 4 wherein said timing pulse generating means comprises a further set of $n$ AND gates, pulse counting means responsive to said clock pulses having a plurality of output terminals, means for connecting the AND gates to said output terminals so that the AND gates respond to varying predetermined counts to produce the timing pulses.

6. The inverter according to claim 5 including voltage regulating means to maintain the amplitude of the sinusoidal wave constant including means to produce a pulse train having a repetition rate proportional to the wave amplitude, means to apply said pulse train to said pulse counting means to vary the time required to reach said predetermined counts to change the position of said timing pulses.

* * * * *